(12) United States Patent
Lee et al.

(10) Patent No.: US 8,001,293 B2
(45) Date of Patent: Aug. 16, 2011

(54) DATA RELAY APPARATUS FOR COMMUNICATION MODULE

(75) Inventors: Soo Gang Lee, Anyang-si (KR); Dae Hyun Kwon, Anyang-si (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 97 days.

(21) Appl. No.: 12/558,457

(22) Filed: Sep. 11, 2009

(65) Prior Publication Data
US 2010/0169515 A1  Jul. 1, 2010

(30) Foreign Application Priority Data
Dec. 31, 2008  (KR) .................. 10-2008-0138838

(51) Int. Cl.
*G06F 3/00* (2006.01)
(52) U.S. Cl. ................ 710/20; 710/36; 710/38
(58) Field of Classification Search .............. 710/20, 710/36, 38
See application file for complete search history.

(56) References Cited

U.S. PATENT DOCUMENTS

| | | | |
|---|---|---|---|
| 5,982,595 A * | 11/1999 | Pozzuoli | 361/62 |
| 6,441,931 B1 * | 8/2002 | Moskovich et al. | 398/9 |
| 2006/0077891 A1 * | 4/2006 | Smith et al. | 370/220 |

* cited by examiner

*Primary Examiner* — Alford Kindred
*Assistant Examiner* — David Martinez
(74) *Attorney, Agent, or Firm* — Lee, Hong, Degerman, Kang & Waimey

(57) ABSTRACT

A data relay apparatus for communication module is disclosed, whereby a plurality of normally operative communication modules can perform data communication thereamong by allowing a data relay unit to relay data received by an input/output (I/O) port of an inoperative communication module in a case there is available an inoperative communication module among the plurality of communication modules, in a network configured by connecting the plurality of communication modules having two I/O Ethernet communication ports connected via a line topology.

7 Claims, 2 Drawing Sheets

[Fig. 1]
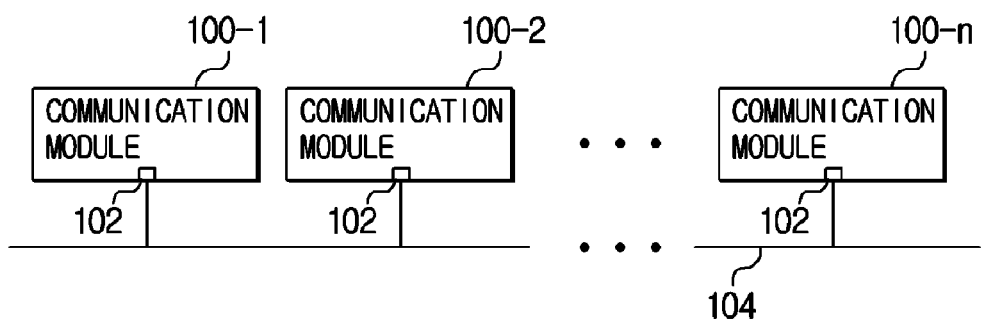
[Fig. 2]
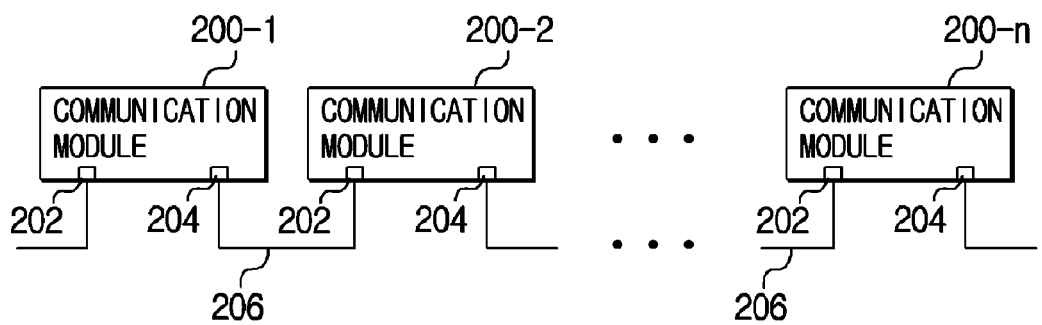

[Fig. 3]
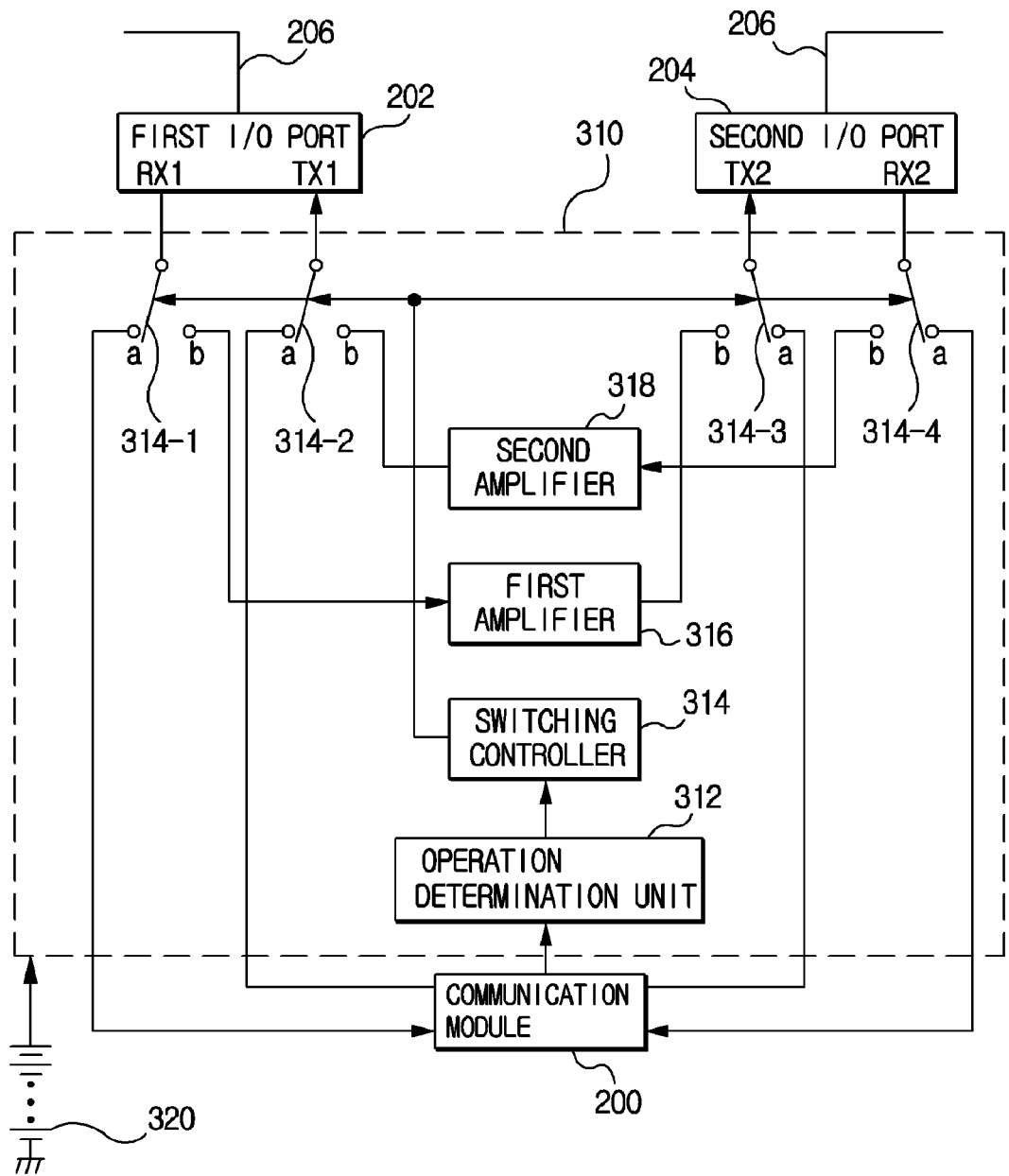

DATA RELAY APPARATUS FOR COMMUNICATION MODULE

CROSS-REFERENCE TO RELATED APPLICATION

The present application is based on, and claims priority from, Korean Application Number 10-2008-0138838, filed Dec. 31, 2008, the disclosure of which is incorporated by reference herein in its entirety.

BACKGROUND OF THE INVENTION

1. Field of the Invention

The present disclosure relates to a data relay apparatus for communication module, and more particularly to a data relay apparatus for communication module, whereby a plurality of normally operative communication modules can perform data communication thereamong by allowing a data relay unit to relay data received by an input/output (I/O) port of an inoperative communication module in a case there is available an inoperative communication module among the plurality of communication modules, in a network configured by connecting the plurality of communication modules having two I/O Ethernet communication ports connected via a line topology.

2. Description of the Related Art

Generally, a factory automation (FA) system uses an operating method of directly accommodating different application requiring different numbers and types of input/output (I/O) circuits.

Recently, a plurality of devices is connected thereamong for communication via a network for reasons of development of communication technology, convenience of accommodation and cost reduction.

In the networks, a plurality of devices is known to be configured via a general-purpose network such as Ethernet (registered trademark, hereinafter omitted) as a communication module.

The Ethernet is the most widespread technology increasingly used in industrial manufacturing for data exchange between work stations and between office networks due to advantages of high data transmission rates (real time capability of data transmission), popularity/affinity with media, and a relatively low installation cost compared with that of field bus communication module.

Furthermore, the Ethernet disposed with two input/output (I/O) ports is also focused with advantages such as an embedded switching function capable of serially connecting each communication module to help solve a disadvantage of star topology in which failure of a centralized switch stops the entire networks.

In a case a network is configured with a line topology using the Ethernet as communication module, and if any one communication module located in midsection of the network becomes inoperative, the inoperative communication module cannot relay received data to disable normally operating communication modules to perform the data communication, unlike the conventional field bus communication module method.

Therefore, there is a need of relaying received data via the two I/O ports, even if one communication module becomes inoperative, for maintaining the strong point of Ethernet communication module mounted with two I/O ports having the abovementioned switching function and the strong point of the conventional field bus topology configuration.

SUMMARY OF THE INVENTION

The present disclosure is directed to provide a data relay apparatus for communication module in which, where a data relay apparatus capable of relaying data is installed, and any one communication module cannot operate normally, the data relay unit outputs and relays data received from a first input/output (I/O) port to a second I/O port, and outputs and relays the data received from the second I/O port to the first I/O port, whereby a plurality of normally operating communication modules can perform a normal data communication between and among the communication modules.

The present disclosure is also directed to provide a data relay apparatus for communication module in which, the data relay apparatus can be provided with a battery-charged voltage, such that the data relay apparatus can normally operate and perform the data relay function even in a power failure.

The present general inventive concept may, however, be embodied in many different forms and should not be construed as limited to the embodiments set forth herein. Rather, these embodiments are provided so that this disclosure will be thorough and complete, and will fully convey the scope of the general inventive concept to those skilled in the art.

According to the data relay apparatus for communication module, a data relay apparatus is integrally installed with a communication module. The data relay apparatus may be provided with a battery-charged voltage to enable itself to operate even in a power failure.

The data relay apparatus may determine whether the communication module operates normally. Whether the communication module operates normally may be determined by whether an operation voltage has been applied to a power terminal of the communication module. The data relay apparatus may determine that the communication module operates normally when an operation voltage is applied to a power terminal of the communication module, and determine that the communication module does not operate normally when an operation voltage is not applied to a power terminal of the communication module.

The data relay apparatus may determine whether the communication module operates normally using various methods in addition to the operation voltage supplied to the communication module.

In a case that it is determined that the communication module operates normally, the data relay apparatus may allow data received via a first I/O port to be inputted, processed, amplified, outputted to a second I/O port and relayed by the communication module, and may allow data received via the second I/O port to be inputted, processed, amplified, outputted to the first I/O port and relayed by the communication module.

In a case that it is determined that the communication module does not operate normally, the data relay apparatus may allow the data received via the first I/O port to be amplified, outputted to the second I/O port and relayed, and the data received via the second I/O port to be amplified, outputted to the first I/O port and relayed.

The data relay apparatus may be installed with an operation determination unit which in turn receives an operation voltage of the power terminal at the communication module to determine whether the communication module operates normally.

A switching controller may generate a switching signal in response to a determination signal of the operation determination unit to switch a plurality of switching elements. The data relay unit may be installed with a first amplifier and a second amplifier to amplify a predetermined data received via the first and second I/O port.

In accordance with one general aspect of the present invention, there is provided a data relay apparatus for communication module, comprising: first and second input/output (I/O) port through which data is received and transmitted; a communication module processing data received via the first I/O port, and outputting and relaying the data to the second I/O port, and processing data received via the second I/O port, and outputting and relaying the data to the first I/O port; and a data relay unit determining whether the communication module operates normally, allowing relaying the data received via the first and second I/O port in a case the communication module operates normally, and allowing outputting and relaying the data received via the first I/O port to the second I/O port in a case the communication module does not operate normally, and outputting and relaying the data received via the second I/O port to the first I/O port, where the communication module is an Ethernet.

In some exemplary embodiment of the present disclosure, the data relay unit may determine the operation of the communication module according to whether an operation voltage is applied to a power terminal of the communication module.

In some exemplary embodiment of the present disclosure, the data relay unit may comprise: an operation determination unit determining whether the communication module operates; a switching controller generating a switching signal in response to an output signal of the operation determination unit; and a plurality of switching elements being switched in response to the switching signal from the switching controller to allow the data received from the first and second I/O ports to be relayed via the communication module, or to allow the data received from the first and second I/O ports to be outputted and relayed to the second and first I/O ports.

In some exemplary embodiment of the present invention, the data relay unit may further comprise: a first amplifier amplifying the data received from the first I/O port and outputting the amplified data to the second I/O port; and a second amplifier amplifying the data received from the second I/O port and outputting the amplified data to the first I/O port.

In some exemplary embodiment of the present invention, the operation determination unit may determine the operation of the communication module according to whether an operation voltage is applied to a power terminal of the communication module.

In some exemplary embodiment of the present invention, the data relay unit may be operated by a charged voltage of a battery.

BRIEF DESCRIPTION OF THE DRAWINGS

Reference will now be made in detail to the embodiments of the present disclosure, examples of which are illustrated in the accompanying drawings, wherein like reference numerals refer to the like elements throughout. The embodiments are described below in order to explain the present disclosure by referring to the figures. The present disclosure may, however, be embodied in many different forms and should not be construed as limited to the embodiments set forth herein. Rather, these embodiments are provided so that this disclosure will be thorough and complete, and will fully convey the scope of the general inventive concept to those skilled in the art.

FIG. 1 is a schematic view of a network in which a line topology of the conventional field bus communication method is connected in the form of daisy chain structure.

FIG. 2 is a schematic structural view of a network in which a plurality of Ethernets is connected in a line topology.

FIG. 3 is an exemplary configuration of a data relay apparatus according to the present disclosure.

DETAILED DESCRIPTION OF THE INVENTION

For the purpose of clarity, technical material that is known in the technical fields related to the disclosure has not been described in detail so that the disclosure is not unnecessarily obscured. The terms and phrases therefore should be defined based on the contents across an entire specification.

Furthermore, terms and phrases used in the specification and claims may be interpreted or vary in consideration of construction and use of the present disclosure according to intentions of an operator or customary usages.

FIG. 1 is a schematic view of a network in which a line topology of the conventional field bus communication method is connected in the form of daisy chain, where reference numerals 100-1, 100-2 . . . , 100-n represent a plurality of communication modules. Each of the plurality of communication modules (100-1, 100-2 . . . , 100-n) is disposed with an input/output (I/O) port 102. The one I/O port 102 disposed at each of the plurality of communication modules (100-1, 100-2 . . . , 100-n) is connected in parallel to a communication cable 104 to form a network in which a field bus communication method is connected in the line topology.

The network in FIG. 1 is configured in such a manner that, even if one or more communication modules become inoperative due to non-supply of power thereto or due to failure, communication modules operating in normal condition can perform the normal data communication thereamong.

That is, as the plurality of communication modules (100-1, 100-2 . . . , 100-n) is connected in parallel to a communication cable 104, the normally operating communication modules can perform the data communication in a normal condition thereamong.

FIG. 2 is a schematic structural view of a network in which a plurality of Ethernets is connected in a line topology, where reference numerals 200-1, 200-2 . . . , 200-n represent a plurality of communication modules. Each of the plurality of communication modules (200-1, 200-2 . . . , 200-n) is disposed with a first I/O port 202 and a second I/O port 204.

The first I/O port 202 and the second I/O port 204 mounted on the plurality of communication modules (200-1, 200-2 . . . , 200-n) are serially connected via a plurality of communication cables 206 to form a network in line topology.

That is, each of the second I/O ports 204 mounted on the plurality of communication modules (200-1, 200-2 . . . , 200-n) is respectively connected to the first I/O port 202 disposed at the communication modules (200-1, 200-2 . . . , 200-n) via the communication cable 206 to form a line topology.

Each of the plurality of communication modules (200-1, 200-2 . . . , 200-n) in the network of line topology processes a predetermined data received via the first I/O port 202, where the processed data is amplified, outputted to the second I/O port 204, and transmitted to other communication modules (200-3, 200-4 . . . , 200-n) via the communication cable 206.

Furthermore, each of the plurality of communication modules (200-n, 200-n-1 . . . , 200-2) processes a predetermined data received via the second I/O port 204, where the processed data is amplified, outputted to the first I/O port 202, and transmitted to other communication modules (200-n-1, 200-n-2 . . . , 200-1) via the communication cable 206.

As noted in the foregoing, the network of line topology thus configured with the plurality of communication modules (200-1, 200-2 . . . , 200-n) disposed with two I/O ports 202, 204 enables the plurality of communication modules (200-1, 200-2 . . . , 200-n) to transmit a predetermined data at a fast speed to a dual direction.

However, in a case any one communication modules (200-1, 200-2 . . . , 200-n) constituting the line topology becomes inoperative due to non-supply of operation power, the normally operating communication modules may fail to transmit a predetermined data For example, in a case the communication module 200-2 fails to operate due to non-supply of operation power, the communication module 200-1 and the communication modules (200-3, 200-4 . . . , 200-n) cannot exchange a predetermined data thereamong.

Therefore, even if the communication modules (200-1, 200-2 . . . , 200-n) become inoperative, there is a need to allow a normal data communication to be realized by relaying the data received from the first I/O port 202 to the second I/O port 204, and by relaying the data received from the second I/O port 204 to the first I/O port 202.

FIG. 3 is an exemplary configuration of a data relay apparatus according to the present disclosure, where reference numeral 200 is a communication module.

The communication module 200 serves to input a predetermined data received from the first I/O port 202, provide the received data to a controller (not shown), let it processed thereby, amplify the received/processed data and output/relay the data to the second I/O port 204.

Furthermore, the communication module 200 serves to input a predetermined data received from the second I/O port 202, provide the received data to a controller (not shown), let it processed thereby, amplify the received/processed data and output/relay the data to the first I/O port 202.

Reference numeral 310 represents a data relay unit for relaying data inputted/outputted via the first and second I/O ports 202, 204. The data relay unit 310 is operated by a charged voltage of a battery 220 apart from the communication module 200.

The data relay unit 310 may determine whether the communication module 200 operates normally, and it if is determined that the communication module operates normally, the data relay unit 310 may input the data inputted/outputted via the first and second I/O ports 202, 204 to the communication module 200 and allow the data to be relayed.

If it is determined that the communication module does not operate normally, the data relay unit 310 may amplify the data received from the first I/O port 202 and output the data to the second I/O port 204, and amplify the data inputted from the second I/O port 204 and output/relay the data.

The data relay unit 310 may include an operation determination unit 312, a switching controller 314, a first amplifier 316, a second amplifier 318 and first-fourth switching elements (314-1, 314-2, 314-3, 314-4).

The operation determination unit 312 may determine whether the communication module 200 operates normally. For example, the operation determination unit 312 may determine whether an operation voltage is supplied to a power terminal of the communication module 200. As a result of the determination, if it is determined that the operation voltage is supplied to the power terminal of the communication module 200, the operation determination unit determines that the communication module operates normally, and if it is determined that the operation voltage is not supplied to the power terminal of the communication module 200, the operation determination unit determines that the communication module does not operate normally.

The operation determination unit 312 may be so configured as to determine whether the communication module operates normally, in addition to the said determination of whether the operation voltage is supplied to the power terminal of the communication module 200, using various other methods.

The switching controller 314 may switch the plurality of switching elements (314-1, 314-2, 314-3, 314-4) by generating a switching signal in response to a determination signal generated by the operation determination unit 312. For example, if the operation determination unit 312 determines that the communication module 200 operates normally, the switching controller 314 may connect movable terminals of the plurality of switching elements (314-1, 314-2, 314-3, 314-4) to a fixation terminal (a) of one side. If the operation determination unit 312 determines that the communication module 200 does not operate normally, the switching controller 314 may connect movable terminals of the plurality of switching elements (314-1, 314-2, 314-3, 314-4) to a fixation terminal (b) of the other side.

The first amplifier 316 may amplify the data received from a reception terminal (RX1) of the first I/O port 202 and output the data to a transmission terminal (TX1) of the second I/O port 204.

The second amplifier 318 may amplify the data received from a reception terminal (RX2) of the second I/O port 204 and output the data to a transmission terminal (TX1) of the first I/O port 202.

The first switching element 314-1 may switch the data received to a reception terminal (RX1) of the first I/O port 202 and selectively input the data to the communication module 200 or the first amplifier 316.

The second switching element 314-2 may select the data outputted to the first I/O port 202 by the communication module 200 and the data outputted by the second amplifier 318, and output the data to the transmission terminal (TX1) of the first I/O port 202.

The third switching element 314-3 may select the data outputted to the second I/O port 204 by the communication module 200 and the data outputted by the first amplifier 316, and output the data to the transmission terminal (TX2) of the second I/O port 204.

The fourth switching element 314-4 may switch the data inputted to a reception terminal (RX2) of the second I/O port 204, and selectively input the data to the communication module 200 or the second I/O port 204.

The data relay apparatus thus configured according to the present disclosure is operated in such a manner that the operation determination unit 312 determines whether the communication module 200 operates normally and generates a determination signal under a situation where the charged voltage of the battery 220 is applied to the data relay unit 310 as an operation voltage.

For example, the operation determination unit 312 may input a voltage to a power terminal of the communication module 200 to determine whether the operation voltage is normally supplied to the communication module 200.

As a result of the determination, if it is determined that the operation voltage has been supplied to the power terminal of the communication module 200, the operation determination unit 312 determines that the communication module 200 operates normally. If it is determined that the operation voltage has not been supplied to the power terminal of the communication module 200, the operation determination unit 312 determines that the communication module 200 does not operate normally.

As a result of the determination, if it is determined that the communication module 200 operates normally, the switching controller 314 may connect the movable terminals of the plurality of switching elements (314-1, 314-2, 314-3, 314-4) to the fixation terminal (a) of one side in response to the control of the operation determination unit 312.

Then, the predetermined data received by the reception terminal (RX1) of the first I/O port 202 may be inputted into and processed by the communication module 200 via the switching element 314-1, and the inputted data may be amplified by the communication module 200 and outputted to the transmission terminal (TX2) of the second I/O port 204 via the switching element 314-3 to be transmitted to other communication modules 200 via a communication cable 206.

The predetermined data received by the reception terminal (RX2) of the second I/O port 204 may be inputted into and processed by the communication module 200 via the switching element 314-4, and the inputted data may be amplified by the communication module 200 and outputted to the transmission terminal (TX1) of the first I/O port 202 via the switching element 314-2 to be transmitted to other communication modules 200 via a communication cable 206.

That is, the data relay apparatus according to the present disclosure processes the data inputted into/outputted from the first and second I/O ports 202, 204, amplifies and outputs in a case the communication module 200 operates normally.

Meanwhile, as a result of the determination by the operation determination unit 312, if it is determined that the communication module 200 does not operate normally, the switching controller 314 may connect the movable terminals of the switching elements (314-1, 314-2, 314-3, 314-4) to the fixation terminal (b) of the other side in response to the control of the operation determination unit 312.

Successively, the predetermined data received by the reception terminal (RX1) of the first I/O port 202 may be inputted into the first amplifier 316 via the first switching element 314-1, amplified, outputted to the transmission terminal (TX2) of the second I/O port 204 via the third switching element 314-3, and transmitted to other communication module 200.

Then, the predetermined data received by the reception terminal (RX2) of the second I/O port 204 may be inputted into the second amplifier 318 via the fourth switching element 314-4, amplified, outputted to the transmission terminal (TX1) of the first I/O port 202 via the second switching element 314-2, and transmitted to other communication module 200.

As apparent from the foregoing, the present disclosure is operated in such a manner that the predetermined data received by the first I/O port 202 is amplified by the first amplifier 316 of the data relay unit 310, outputted to the second I/O port 204 and relayed, in a case the communication module does not operate, and the predetermined data received by the second I/O port 204 is amplified by the second amplifier 318 of the data relay unit 310, outputted to the first I/O port 202 and relayed, in a case the communication module does not operate.

Therefore, in a network configured to connect the plurality of communication modules in line topology, even if a particular communication module does not operate, data transmitted via the first and second I/O ports can be relayed to allow the normally-operating communication modules to perform the data communication in the normal way.

While the disclosure has been described by way of examples and in terms of exemplary embodiments, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data relay apparatus, comprising:
    a communication module comprising a first input/output (I/O) port and a second I/O port, each of the first I/O port and the second I/O port configured for receiving and transmitting data, the communication module configured for processing data received via the first I/O port and outputting and relaying the data to the second I/O port, and processing data received via the second I/O port and outputting and relaying the data to the first I/O port; and
    a data relay unit configured for determining whether the communication module operates and for allowing the communication module to process and relay the data received via the first I/O port and the second I/O port, or for allowing outputting and relaying the data received via the first I/O port to the second I/O port and outputting and relaying the data received via the second I/O port to the first I/O port, the data relay unit comprising:
        an operation determination unit configured for performing the determination of whether the communication module operates;
        a switching controller configured for generating a switching signal in response to an output signal from the operation determination unit; and
        a plurality of switching elements configured for switching in response to the switching signal from the switching controller for allowing the data received via the first I/O port and the second I/O port to be relayed via the communication module, or for allowing the data received via the first I/O port to be output and relayed to the second I/O port and for allowing the data received via the second I/O port to be output and relayed to the first I/O port.

2. The apparatus of claim 1, wherein the communication module is an Ethernet.

3. The apparatus of claim 1, wherein:
    the communication module further comprises a power terminal; and
    the operation determination unit is further configured for determining whether the communication module operates based on whether an operation voltage is applied to the power terminal of the communication module.

4. The apparatus of claim 1, wherein the data relay unit is further configured for:
    allowing the communication module to process and relay the data received via the first I/O port and the second I/O port when the operation determination unit determines that the communication module operates normally; and
    outputting and relaying the data received via the first I/O port to the second I/O port and outputting and relaying the data received via the second I/O port to the first I/O port when the operation determination unit determines that the communication module does not operate normally.

5. The apparatus of claim 1, wherein the data relay unit further comprises:

a first amplifier configured for amplifying the data received from the first I/O port and outputting the amplified data to the second I/O port; and a second amplifier configured for amplifying the data received from the second I/O port and outputting the amplified data to the first I/O port.

6. The apparatus of claim 1, wherein the operation determination unit is further configured for determining whether the communication module operates based on whether an operation voltage is applied to a power terminal of the communication module.

7. The apparatus of claim 1, wherein the data relay unit is further configured for being operated via a charged voltage of a battery.

* * * * *